United States Patent Office 3,395,878
Patented Aug. 6, 1968

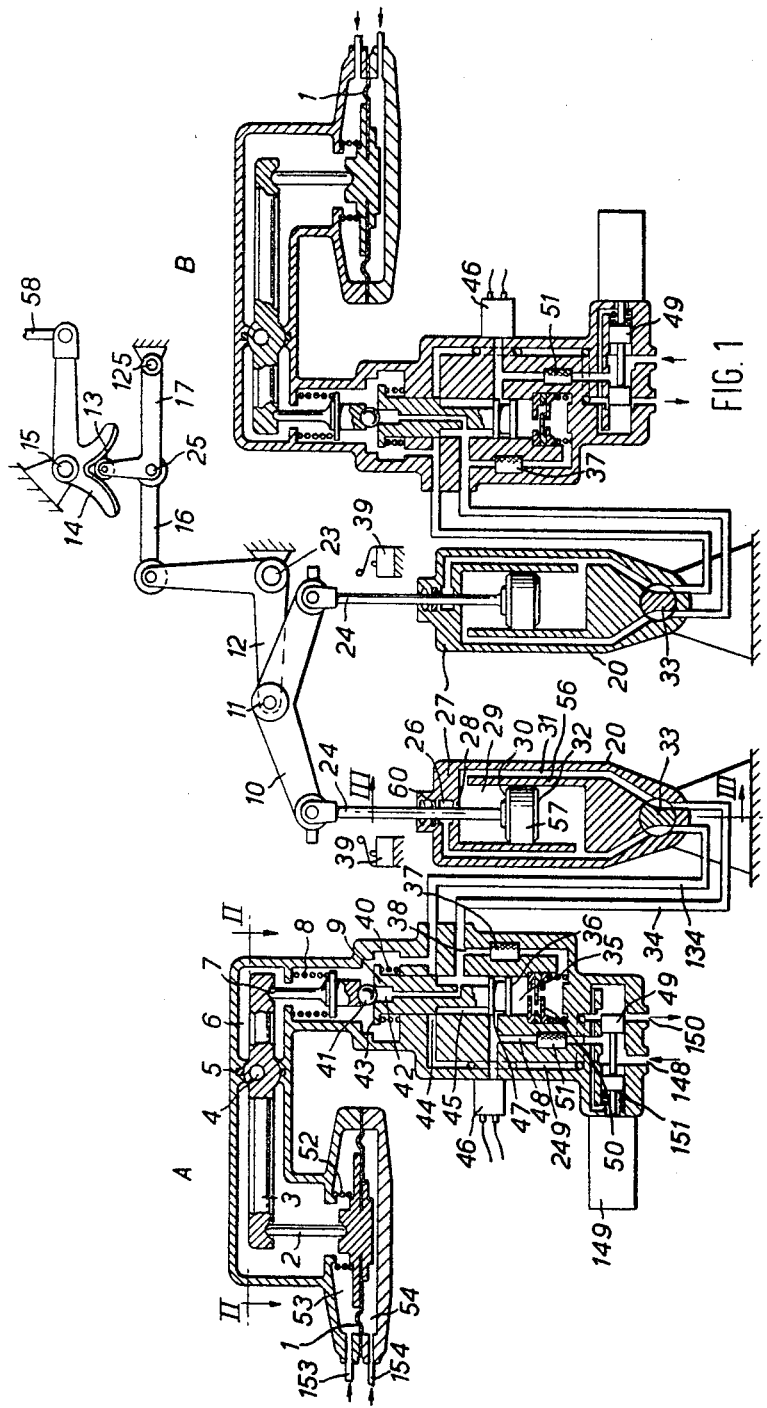

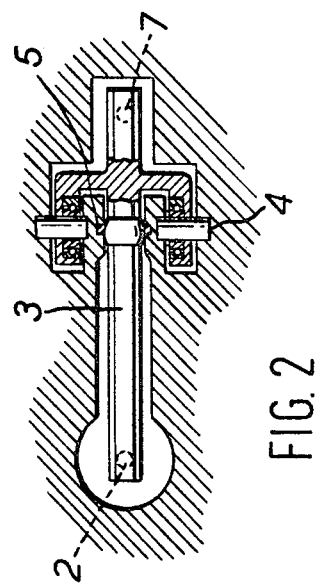
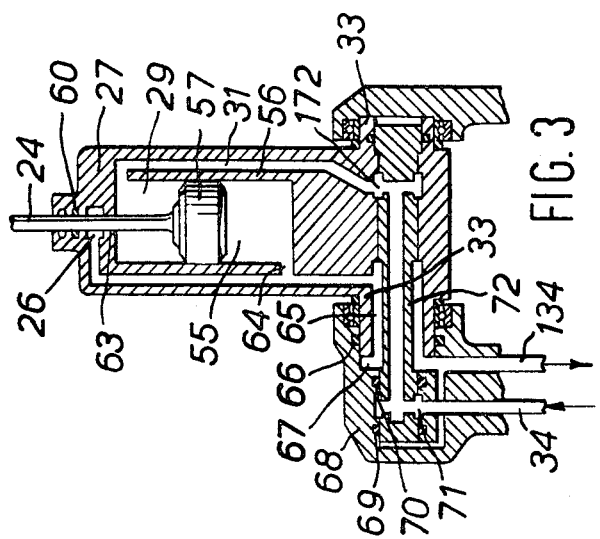

3,395,878
FEEL SIMULATORS
Roy Westbury, Bridgnorth, England, assignor to H. M. Hobson Limited, London, England, a company of Great Britain
Filed Nov. 8, 1967, Ser. No. 681,460
Claims priority, application Great Britain, Nov. 18, 1966, 51,700/66
6 Claims. (Cl. 244—83)

ABSTRACT OF THE DISCLOSURE

A duplicated feel simulator for aircraft which includes two hydraulic feel units, each comprising a hydraulic jack coupled to a pilot's input member and arranged to displace fluid against an opposing resistance which increases with displacement of the input member from a neutral resistance and also with increase in airspeed, the jacks being coupled to the input member through a differential link and two switches being provided which are respectively actuated by swinging of the differential link in one or the other direction as the result of an excessive discrepancy between the positions of the jacks arising from failure of one of the units to afford to the pilot an indication of which unit has failed.

---

Figure 4:
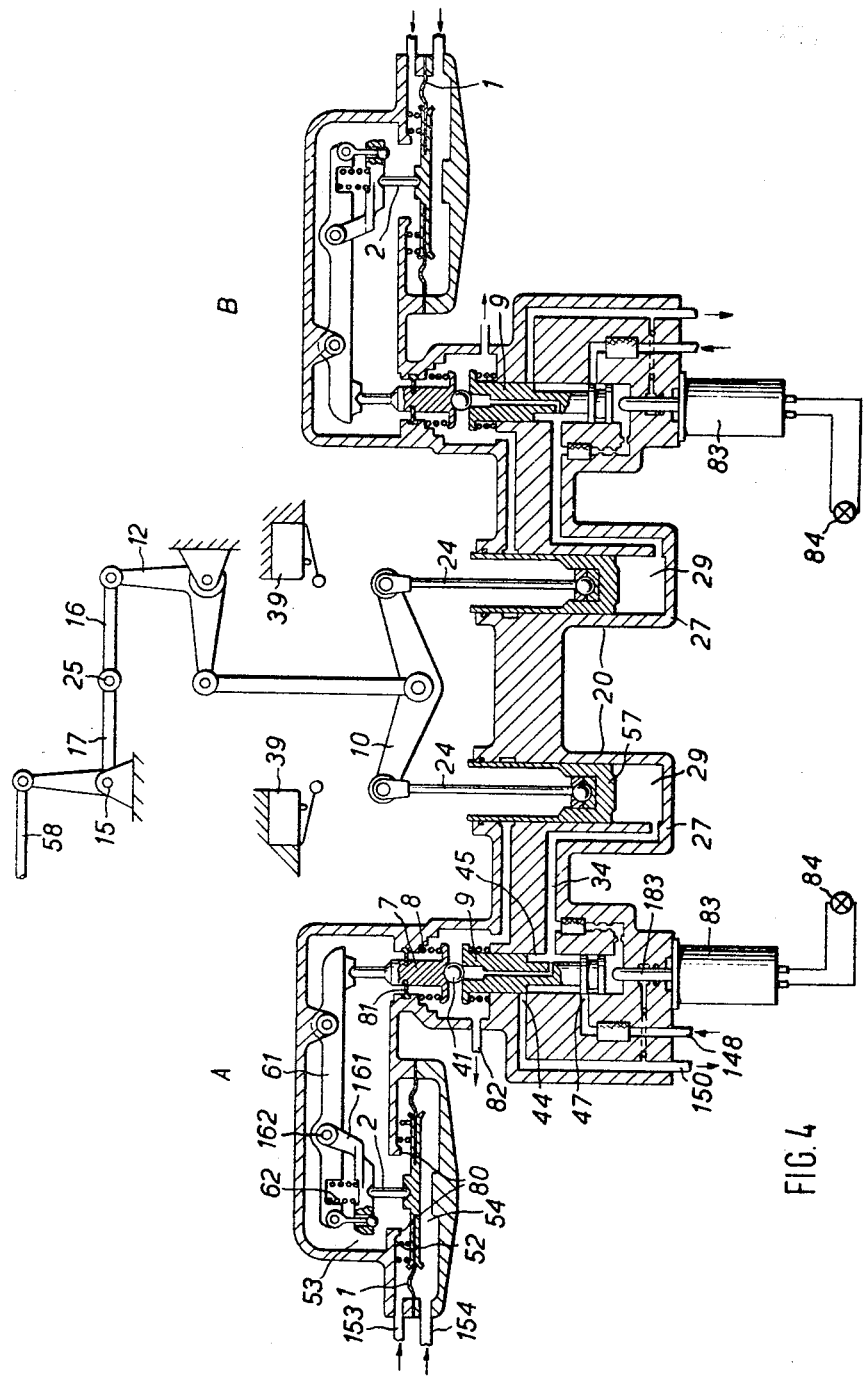

This invention relates to a feel simulator system for aircraft of the kind, described for example in United States Patent No. 2,783,006, comprising a hydraulic jack coupled to a pilot's input member and arranged to displace fluid against an opposing resistance which increases with displacement of the input member in either direction from a neutral position and also increases with increase in airspeed.

For safety reasons it is desirable to duplicate such a feel simulator system and the primary object of the invention is to provide a simple and reliable means for apprising the pilot of failure in one unit of the duplicated system and indicating to him which of the two units has failed so that he may institute remedial action.

In the duplicated system according to the invention, the two jacks are coupled to the pilot's input member through a differential link and two switches are provided which are respectively actuated by swinging of the differential link in one or the other direction as the result of an excessive discrepancy between the positions of the jacks arising from failure of one of the units to afford to the pilot an indication of which unit has failed.

Two embodiments of the invention will now be described with reference to the accompanying diagrammatic drawings, in which:

FIG. 1 shows the first embodiment,
FIGS. 2 and 3 are respectively sections on the lines II—II and III—III in FIG. 1, and
FIG. 4 shows the second embodiment.
Like reference numerals indicate like parts throughout the figures.

The system shown in FIG. 1, which is embodied in the mechanism for operating the elevator of an aircraft, includes two identical feel simulator units A and B, one only of which will be described in detail. Each unit derives power from a separate hydraulic system.

Each unit includes a hydraulic jack 20, consisting of a cylinder 27 containing a piston 57 which is moved upwardly as later described, upon actuation of an input member 58 connected to the pilot's control column, against a hydraulic signal pressure in a chamber 29 in the jack which is varied as a function of dynamic pressure $q$ also as later described. The hydraulic signal pressure is controlled by a control valve 9.

Each unit includes a flexible diaphragm 1, which is subjected at its opposite sides to pitot pressure admitted through an inlet 154 to a chamber 54 and to static pressure admitted through an inlet 153 to a chamber 53. The diaphragm 1 accordingly exerts in an upward direction a force proportional to dynamic pressure $q$. This force is transmitted by a push rod 2 to a lever 3. The lever 3 is pivoted at 4 and extends through a flexible seal 5 into a chamber 6 which contains hydraulic fluid at return line pressure. The force transmitted by the lever 3 is applied to the control valve 9 by a push rod 7. The valve 9 is maintained in a state of equilibrium by the action of the hydraulic pressure in a chamber 35 which is applied to its lower end face 36. The chamber 35 communicates via a passage 38 with a chamber 45, which is connected by a passage 34 with the chamber 29 in the jack. Accordingly the hydraulic pressure acting on the undersurface of the valve 9 is the signal pressure. When the force applied to the valve 9 by the push rod 7 increases, the valve 9 is displaced to open a port 47 to connect the chamber 45 to a fluid supply passage 48 communicating with a supply port 148, so increasing the signal pressure upon the end face 36 of the valve 9. When the increased hydraulic pressure acting on the valve balances that applied by the push rod 7, the valve moves to close the supply pressure port 47 and maintain the new lever of signal pressure in the chamber 45. A series cascade of orifices 50, through which the fluid displaced by the valve must pass, provides damping.

Conversely, in response to decreasing force on the push rod 7 the control valve 9 moves to open an exhaust port 44 connected by a passage 249 to a return port 150, thus allowing the signal pressure, and hence the hydraulic force acting on the end face 36 of the valve 9, to fall. When the reduced signal pressure balances the force applied by the push rod 7, the valve 9 returns to its closed position, maintaining the signal pressure at its required reduced value.

At zero dynamic pressure $q$ the hydraulic signal pressure is maintained at a finite value by a fixed force on the valve 9 provided by springs 8 and 40. This minimum base signal pressure is maintained with increasing $q$ up to the value corresponding to a predetermined minimum aircraft stalling speed by a spring 52 which exerts a constant force in opposition to that developed by $q$ acting on the diaphragm 1. When the aircraft speed exceeds the minimum stalling speed force exerted by the diaphragm 1 will overcome the spring 52 and the surplus force will be transmitted to the control valve 9 to command an increase in hydraulic signal pressure.

Return line pressure is communicated directly to the larger face 32 of the jack piston 57 in opposition to the signal pressure acting on its smaller face 30.

However, return line pressure also acts upon the end face 43 of the control valve 9. Because the effective area of this end face is exactly equal to that of the face 36 at the opposite end of the valve on which signal pressure acts, finite pressure in the return line causes the signal pressure to be augmented by an equal amount. This tends to compensate for the effect of return line presure acting on the face 32 of the jack piston. This alone does not give complete compensation because of the larger jack piston area 32 subjected to return line pressure.

To obtain complete compensation, the force impressed directly on the control valve 9 by the return line pressure is augmented by a force developed on the lever 3 by the same return line pressure. As shown in FIG. 2, the lever 3 is circular in section at the point where it passes through the flexible seal 5. The centre line of the pivot 4 of the lever 3 lies in the same plane as the seal but is displaced by a small amount from the axis of the lever. The return line pressure acting on the sealed area of the lever acts at this finite distance from the pivot 4 to provide a moment on the lever which applies added force to the valve 9, augmenting the force generated by the push rod 7. This augmentation of valve force produces the desired increment in hydraulic signal pressure which will compensate for the differential area of the hydraulic jack.

The jack cylinder 27 is suspended on trunnions 33 through one of which the hydraulic signal pressure and return lines are introduced, as shown in FIGURE 3. Fluid at signal pressure is picked up from an annulus 71 in a bearing lug 68, which communicates with the passage 34, by a tube 72 which is shrunk into the jack cylinder 27. The fluid passes through the tube 72 and out into an annulus 172 from where it passes along a passage 31 into the chamber 29.

Return line pressure is picked up from a passage 134 at an annulus 67 in the bearing lug 68 and passes along an annular space 65, formed between the signal pressure tube 72 and the trunnion 33, and through a passage 64 into the chamber 55 below the piston 57.

Three seals are provided, two of them 69 and 70 isolating signal pressure from return line pressure and a third 66 isolating return line pressure from atmosphere. Axial forces due to signal pressure are balanced, but there is a small axial force due to return line pressure which is reacted by the trunnion bearing.

The jack includes a steel piston rod 24 operating in a steel liner 56 housed in the cylinder body 27 which is made of aluminum. The rod 24 is sealed by a close fit metal-to-metal seal at 63 with a return line pressure gallery 26 beyond it and by a rubber seal 60 to prevent low pressure leakage to atmosphere.

The piston rods 24 of the two jacks are attached to opposite ends of a differential lever 10, which is suspended at its mid-point 11 on a bell-crank lever 12 which is pivoted on a fixed pivot 23. The sum of the forces developed by the two jacks is transferred through the bell-crank lever 12 to apply tension to toggle links 16 and 17, which are connected by a pin 25. The link 17, which is pivoted at 125, carries a roller 13 which engages with a cam 14 mounted on an output shaft 15. As the shaft is rotated by movement of the input member 58, the roller 13 is displaced and the links 16 and 17 are deflected from their neutral in-line position. The resulting torque in the output shaft 15, which is manifest as a feel force to the pilot, increases with increase in the signal pressure in the chambers 29 of the jack. The profile of the cam 13 is such that the torque in the output shaft 15 increases in desired relationship with increase in displacement from neutral position of the pilot's input member 58.

Displacement of the output shaft 15 in either direction from its neutral position in response to movement of the input member 58 causes both jacks to be extended, the rods 24 moving out of their respective cylinders. As the fluid is expelled from the cylinders, the signal pressure in the chambers 45 is slightly increased. This causes the control valves 9 to be displaced to open the exhaust port 44 allowing the fluid from the jacks to flow out through the return ports 150.

The system thus utilises as its basic computation elements two identical single stage hydraulic spool valves 9, independently powered from two aircraft hydraulic systems, and signalled by forces produced by identical and independent diaphragm-spring-lever mechanisms, the inputs to which are derived from two sources of pitot and static pressure provided in the aircraft. The output from both valves 9 is a hydraulic signal pressure which is a controlled function of dynamic pressure $q$.

The piston 57 of each jack 20 is subjected to the signal pressure generated by its associated valve 9, which applies a uni-directional load to its piston rod 23.

The forces generated in the two jacks are summed on the differential lever 10 and transmitted through the lever-link-cam system in such manner as to produce a positive centering influence on the output shaft 15.

Rotation of the output shaft 15 can only be achieved by the application of torque. The magnitude of the displacement produced by a given torque is a function of the signal pressure in the jacks. For any given signal pressure the relationship between output torque and displacement is a non-linear function.

The output shaft 15 is coupled to the elevator primary flight control circuit (not shown) and provides stick force/$g$ characteristics which comply with specified requirements.

The inlet passages 48 to both control valves incorporate filters 51. The damping orifices 50 beneath the control valves are protected by wire wound steel screens 37 giving particle separation down to 0.003 in.

Each unit includes a shut-off valve 49 which is normally held open by an actuator 149 and is provided with a spring 151 for closing it when the actuator 149 is de-energized. A pressure switch 46 which senses the pressure in the passage 48 serves to indicate when the shut-off valve 49 is closed. Closure of either shut-off valve 49 vents to return all passages in the associated unit. The purpose of the shut-off valves is to enable a failed unit to be shut off and to enable each unit to be individually checked for performance by shutting off the two units in succession.

All likely failures will result in errors in the signal pressure fed to one of the hydraulic jacks.

As the forces in the two jacks 20 become progressively dissimilar, the differential lever 10 will rotate about its point of attachment 11 to the bell-crank lever 12, producing a reduction in the effective moment arm of the jack exerting the higher force and an increasing moment arm of the jack exerting the lower force. The geometry is such that when the higher force exceeds the lower force by 30% the rod of the jack having the lower signal pressure will have become fully extended with its piston 57 abutting the upper end of the cylinder 27.

The accuracy of the control valves 9 is such that under normal conditions the difference between the two hydraulic signal pressures will not approach this level of discrepancy. Only genuine faults will result in one or other of the jack pistons 57 moving inwardly to its fullest extent. This fact is used to provide the means for detecting failures. Associated with the hydraulic jacks are microswitches 39, each of which closes when its jack approaches the fully retracted position. Closure of either switch 39 results in a signal to an associated elevator feel warning light.

Loss of hydraulic supply pressure to a control valve 9 results in the signal pressure from that valve falling to zero. The affected jack 20 will therefore cease to develop any force on the differential lever 10 and it will be driven to its fully extended position by the action of the force in the unaffected jack combined with the force developed by system return pressure (if any exists) acting on the underside of the affected piston 57. The unaffected jack will meantime have become fully retracted and its associated microswitch 39 will close to signal the failure.

Continued operation of the system without significant change in its characteristics will be possible. The loads to the lever system will now be powered by the unaffected jack alone but geared 2:1 by the differential lever 10, which is now effectively a plain lever pivoting at its connection with the fully extended jack of the failed unit.

During operation the working jack will have to travel through twice its normal working stroke, but this is made possible by the fact that its new datum position is at full retraction which provides it with twice the available stroke within its cylinder.

As the output shaft 15 is rotated in either direction from its neutral position, the working jack is extended and its associated micro-switch 39 will be opened. A relay operating on a hold-in circuit may be interposed between the microswitches 39 and the warning light to obviate successive energisation and de-energisation of the light each time the pilot's control column is displaced from and returned to an area around its neutral position.

A rupture in the material of one of the diaphragms 1 will interconnect the pitot and static lines 154, 152 of that unit and effectively eliminate the pressure difference across the diaphragm 1. The associated control valve 9 will be influenced only by the force in the spring 52 which establishes the base signal pressure, and this constant signal pressure will be maintained.

While the aircraft dynamic pressure $q$ remains at or near the range which normally corresponds to the base signal pressure the fault will go undetected but the feel characteristics will remain normal because both systems are effectively in operation.

When the aircraft dynamic pressure increases beyond the point where the demanded hydraulic signal pressure exceeds the base pressure by 30% the jack associated with the failed system will become fully extended and the associated micro-switch 39 will close. Thus the fault will be detected and normal feel unit characteristics will be maintained by the unaffected control valve and jack as previously described above.

A failure of any seal between supply pressure and signal pressure constitutes a direct leakage which attempts to raise the signal pressure. This will be compensated by the action of the affected control valve 9 which will move in response to the increasing signal pressure to open its exhaust port 44. This will maintain the signal pressure at its correct value even under conditions where the failed seal has completely disintegrated, because the available port area at the value exhaust is capable of passing at low pressure drop the maximum flow which will come through the clearance provided by the failed seal.

Failure of a seal which normally isolates the signal pressure from return pressure constitutes an internal leakage which tends to lower the signal pressure. In response to this tendency the affected control valve 9 will move to open the inlet port 47 to re-instate the correct value of signal pressure. The inlet flow capabilities of the value are limited, and may prove insufficient to maintain the required signal pressure at high values of $q$. In such a case the failure will be indicated by the micro-switch monitor system as soon as the signal pressure in the system affected by the failure fall sufficiently below that of the other system.

A control valve 9 could seize in any of three conditions viz. (a) with its inlet port 47 open, (b) with its exhaust port 44 open, and (c) in the neutral position with the inlet and exhaust ports closed.

Seizure of a control valve with the inlet port open will tend to increase the signal pressure to a value equal to the supply pressure. However, a relief valve 41 is provided which limits the rise in the signal pressure. This valve normally covers a passage 42 in the control valve 9 which carries fluid at signal pressure. The relief valve 41 is normally held in contact with the control valve 9 by the force transmitted to it by the push rod 7. The area of the passage 42 covered by the relief valve is less than the area of the end face 36 of the control valve. This difference in area is such that when the signal pressure has risen to a value 40% above the desired level, the relief valve 42 will open to spill fluid to exhaust.

Under these circumstances, because of the large difference between signal pressures in the two hydraulic jacks, the fault will be detected by the micro-switch arrangement.

Seizure of the control valve with the exhaust port open results in the signal pressure falling to the level of the system return line pressure. There will exist therefore a large percentage difference between the pressures in the two jacks, even when the pressure in the unaffected system is at the minimum demanded level. The failure will therefore be detected and signalled by the micro-switch system.

Seizure of a control valve 9 in its neutral position will result in its relief valve 41 opening each time that the output shaft 15 is displaced, assuming that the leakage past the valve is sufficient to maintain its jack cylinder full of fluid. Successive displacements of the output shaft at short intervals of time will result in cavitation in the jack associated with the seized valve and the signal pressure in that jack will fall to zero.

Failure of the spring 52 biassing a diaphragm 1 against dynamic pressure will result in an increase in the signal pressure developed by the associated valve 9 at all finite values of $q$.

The spring 8 biassing a control valve 9 establishes the minimum level of signal pressure. Should this spring fail the signal pressure in the associated unit will be reduced over the entire $q$ range by an amount equal to the normal minimum value. Thus the correct level of signal pressure as estabilshed by the unaffected control valve will always be the greater of the two and this will establish the feel forces at their correct level.

Failure of either shut-off valve 49 to open will be manifested as a failure of the hydraulic supply and this will be indicated as described above.

The system shown in FIG. 4 is generally similar to that described above and is suitable for a case in which the required stick force per $g$ range can largely be adhered to by the use of a system generating a signal pressure which is proportional to $q$ up to a certain value of equivalent airspeed (EAS) and which remains constant above the corresponding value of $q$. The EAS "cut-off" function is produced by transferring the force exerted by each diaphragm 1 to its control valve 9 via a pre-loaded "scissor" lever 61. The pre-load applied by a spring 62, interposed between the lever 61 and an arm 161, pivoted to it at 162 and abutting against the push rod 2, corresponds to the diaphragm load at the cut-off value of EAS. Beyond this point the upward force generated by the diaphragm 1 overcomes the spring 62 and is transmitted only at the expense of relative movement between the diaphragm and the lever 61 and the diaphragm rapidly bottoms on stops 80. Thereafter no further force is transferred from the diaphragm to the control valve 9.

The cam 14 of FIG. 1 is omitted and the toggle linkage 17, 16 is connected directly between the output shaft and the bell crank 12. Movement of the input member 58 in either direction will break the toggle 17, 16 and rock the bell crank 12 to lower the differential lever 10 and the jack pistons 57. Accordingly the chambers 29 subjected to signal pressure are disposed beneath the pistons 57. The jack cylinders 27 are not hinged at their lower ends as in FIG. 1. As the toggle breaks the force required of the pilot to displace the pistons 57 against the opposing hydraulic signal pressure will increase with increase in the displacement of the input member from its neutral position.

To comply with the requirement for compensation of the effects of return pressure variation, each valve push rod 7 is provided with a seal 81, which has an effective area such that the forces generated on the control valve 9 by return pressure are compensated by the force developed by the same pressure on the seal. The minimum force in the push rod 7 is that due to the spring 52 which establishes the minimum signal pressure. This same force is used to hold the relief valve 41 on its seat in the control valve. To obviate the possibility of the valve 41 lifting unnecessarily, the separation force between push rod and relief valve due to return line pressure should never exceed that of the spring 52.

For the above requirements to be satisfied, the base signal pressure must be at least as great as the maximum return line pressure. To obviate the necessity for a high base pressure a high return line pressure is avoided by the provision of a separate drain line to tank indicated at 82.

Shut-off valves are eliminated and the system includes motor-actuators 83 each of which is provided with a pilot-operated switch 84. These, when actuated, project plungers 183 to push the associated control valves 9 into closed positions in which the signal pressure is reduced to zero whenever shut-off is required. Switches, not shown, are operated by the actuators to indicate the shut-off condition.

What I claim as my invention and desire to secure by Letters Patent is:

1. A duplicated feel simulator for aircraft comprising, in combination with a pilot's input member which is movable in opposite directions from a neutral position, a pair of hydraulic feel units each of which includes a hydraulic jack, deriving power from an individual hydraulic system and having a member movable against a hydraulic signal pressure, and airspeed-responsive means which maintains in the jack a signal pressure which increases with increase in airspeed, a linkage connecting the input member to the movable members of the jacks which imposes increasing resistance to movement of the input member as the latter is moved from its neutral position and includes a differential link arranged to swing in opposite directions in response to discrepancy between the positions of the movable members of the jacks and a pair of switches positioned to be respectively actuated, in response to excessive swinging movement of the differential link in one or other direction resulting from failure of one of the units, to indicate to the pilot which unit has failed.

2. A simulator as claimed in claim 1, in which the differential link is connected at its ends to the movable members of the jacks and centrally to a bell crank and in which the linkage includes a toggle linkage connected between the input member and the bell crank.

3. A simulator as claimed in claim 2, which includes a cam coupled to the input member so as to be rotated upon operation of the input member and coacting with a roller carried by one of the links of the toggle linkage.

4. A simulator as claimed in claim 1, in which each feel unit comprises a control valve subject at one end to the signal pressure in the jack of the unit, a diaphragm subject at opposite sides to pitot pressure and to static pressure, and means for applying to the other end of the control valve a force including the force generated by the diaphragm, the control valve being movable from a neutral position in response to unbalance between the forces on its opposite ends to admit fluid under pressure to the jack on increase in the force generated by the diaphragm and to connect the jack to exhaust on decrease in the force generated by the diaphragm.

5. A simulator as claimed in claim 4, in which the means applying force from the diaphragm to the control valve of each feel unit includes a pivoted lever subject to a force derived from return line pressure in the unit which balances force exerted by return line pressure on the control valve.

6. A simulator as claimed in claim 4, in which the means applying force from the diaphragm to the control valve of each feel unit indicates a pivoted lever and a spring interposed between the diaphragm and the lever and arranged to yield at a given value of equivalent airspeed, the unit including a stop operative after the spring has yielded to terminate further movement of the diaphragm in response to increase in airspeed.

References Cited

UNITED STATES PATENTS 2,772,841    12/1956    Bronsteel _____ 244—83

FOREIGN PATENTS 231,808    1/1961    Australia.
1,006,727    4/1957    Germany.

MILTON BUCHLER, *Primary Examiner.*

R. A. DORNON, *Assistant Examiner.*